United States Patent [19]

Ashby

[11] 4,334,695
[45] Jun. 15, 1982

[54] WALKING BUGGY

[76] Inventor: Walter Ashby, 1049 Whitehurst Landing Rd., Virginia Beach, Va. 23462

[21] Appl. No.: 129,093

[22] Filed: Mar. 10, 1980

[51] Int. Cl.³ .............................................. B62M 1/00
[52] U.S. Cl. .................................................. 280/228
[58] Field of Search ................... 280/228; 272/114, 69

[56] References Cited

U.S. PATENT DOCUMENTS

| | | | |
|---|---|---|---|
| 1,350,546 | 8/1920 | Culver | 280/228 |
| 1,353,011 | 9/1920 | Young | 280/228 |
| 4,151,988 | 5/1979 | Nabinger | 272/69 |

FOREIGN PATENT DOCUMENTS

| | | | |
|---|---|---|---|
| 23427 | 11/1921 | France | 280/228 |
| 606932 | 6/1926 | France | 280/228 |

*Primary Examiner*—Randolph A. Reese
*Assistant Examiner*—Donn McGiehan

[57] ABSTRACT

A tricycle which includes a treadmill walked by a rider in order to power the vehicle, the treadmill including an endless belt, on which the rider's feet are placed, and the treadmill driving a system of pulleys, that turn an axle on which the rear wheels are affixed.

1 Claim, 3 Drawing Figures

U.S. Patent  Jun. 15, 1982  4,334,695
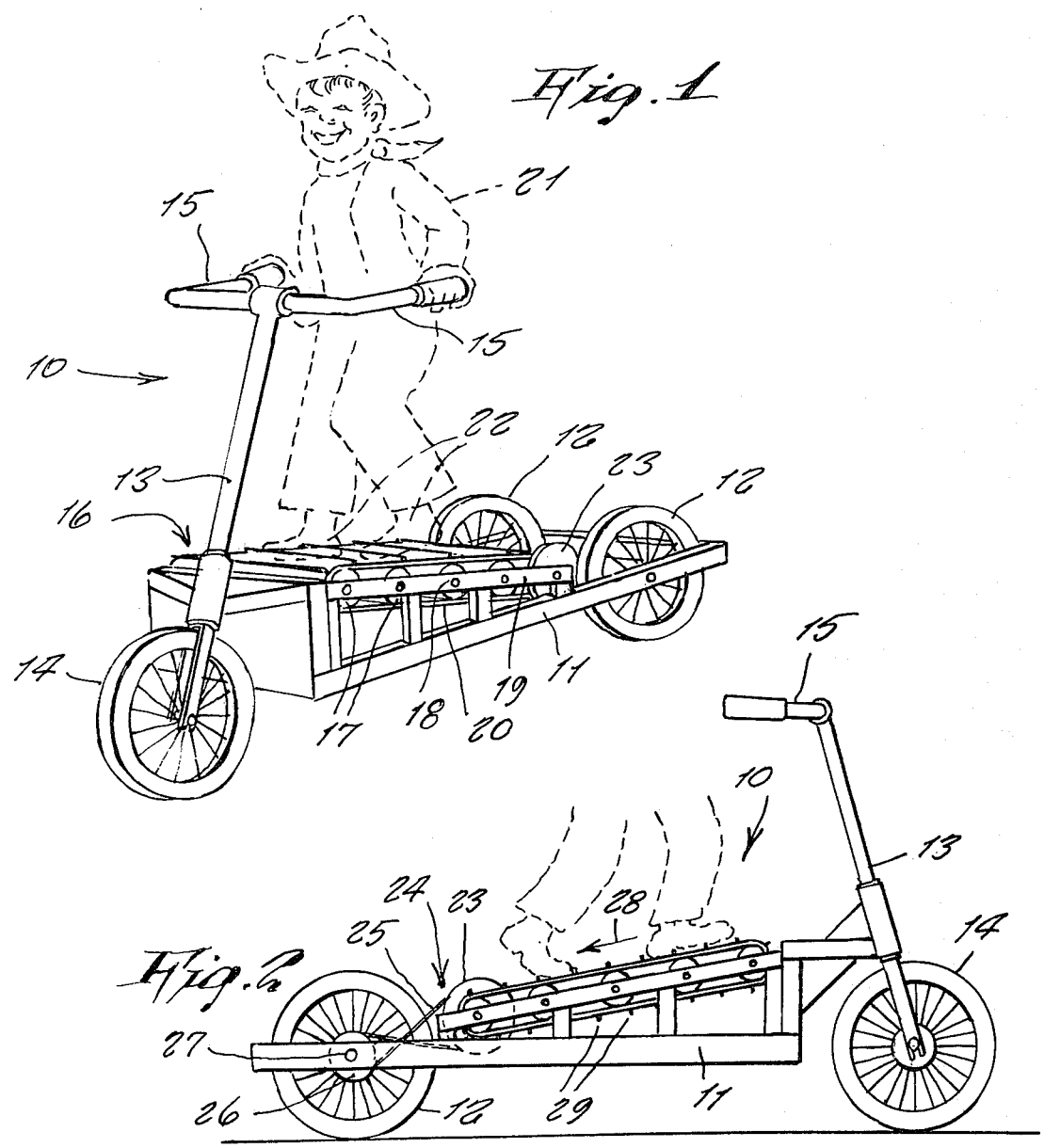
Fig. 1
Fig. 2
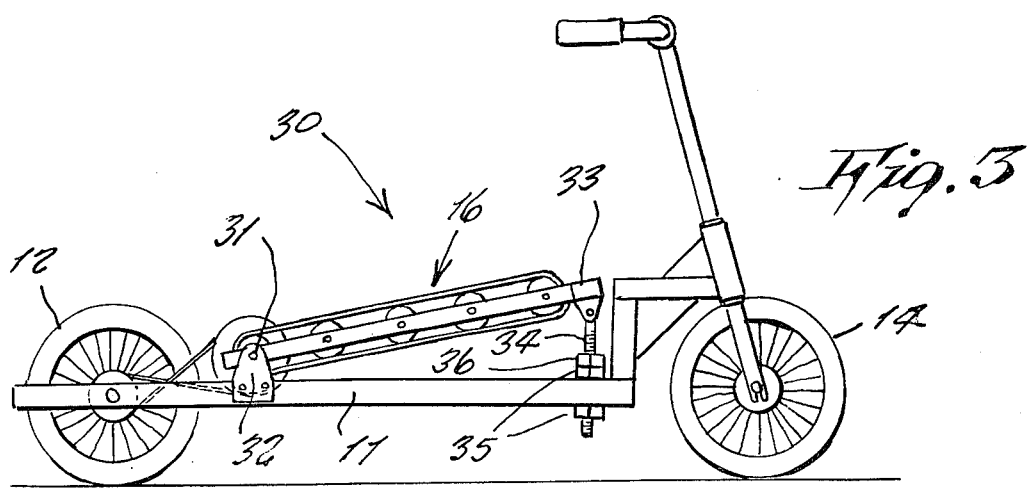
Fig. 3

WALKING BUGGY

This invention relates generally to foot-powered vehicles.

A principal object of the present invention is to provide a vehicle which is propelled by a rider walking a treadmill.

Another object is to provide a vehicle which serves as an amusement ride for a child, and which gives him a greater bodily activity, which pleases children.

Yet another object is to provide a vehicle which serves as an exercising machine for adults, in which a walking movement gives a healthy and invigorating toning of the body muscles.

Other objects are to provide a walking buggy, which is simple in design, inexpensive to manufacture, rugged in construction, easy to use, and efficient in operation.

These, and other objects, will be readily evident, upon a study of the following specification, and the accompanying drawing, wherein:

FIG. 1 is a front perspective view of the invention;

FIG. 2 is an opposite side elevation view thereof; and

FIG. 3 is a similar view, showing a modified design thereof, wherein the treadmill is adjustable in incline, so that a rider can more easily walk or run at any speed, as preferred, for moving the buggy at greatly varied speed rates.

Referring now to the drawing in greater detail, and more particularly to FIGS. 1 and 2 thereof, at this time, the reference numeral 10 represents a Walking Buggy according to the present invention, wherein the vehicle comprises a tricycle, that includes a mainframe 11, supported at its rear end on a pair of rubber-tired wheels 12, and which, at its front end, is supported, pivotally free, on a steering post 13 of a rubber-tired front wheel 14, that is directionally steered by a pair of handle bars 15, at the upper end of the steering post.

In the present invention, a treadmill 16 is mounted upon the mainframe, and includes a row of spaced-apart, transverse extending, rubber rollers 17, each of which is freely rotatable about a shaft 18, supported at its opposite ends in a siderail 19, that forms a rigid component of the mainframe. A rubber treadmill endless belt 20 extends around all the rollers, so that a rider 21 may stand with his feet 22 upon the belt. The belt is inclined slightly upwardly toward the front of the vehicle, so that the rider climbs slightly uphill, when walking forwardly upon the belt.

A rearmost axle of the rollers has a large pulley 23 affixed thereto, that comprises a component of a transmission 24, that transmits power from the treadmill to the rear wheels. The transmission includes an endless belt 25, that extends around the pulley 23, and also around a small pulley 26, affixed on the rear axle 27, to which the rear wheels 12 are also affixed.

Accordingly, in operative use, a rider, standing upon the treadmill belt, and holding the steering post handle bars with his hands, walking in a forwardly, uphill direction, so that gravity force against the rider's weight upon the belt, causes the belt to travel in a direction as indicated by arrow 28. The moving belt turns the rollers and the pulley 23, which then transmits motion to the pulley on the rear axle, so as to cause the rear wheels to travel ahead upon the ground.

A faster speed of vehicle travel is attained, by means of the rider's walking or running faster upon the treadmill. Cleats 29 on the belt 20 provide foot traction.

In FIG. 3, another design of walking buggy 30 is shown, that is the same as the walking buggy 10, except that the inclined angle of the treadmill is selectively adjustable, so as to accommodate better the different speeds of walking, by a rider, upon the treadmill belt. This is accomplished by means of the rear end of the side rails 19 being pivotable about a pin 31, in brackets 32 affixed to the mainframe, and the forward ends of the side rails being integral with a transverse bar 33, supported upon a screw 34, extending downward through the mainframe, and secured thereto at a selected height, by means of nuts 35 and a locknut 36. Alternately a turnbuckle arrangement could substitute for the screw arrangement, so as to be easily adjusted, without tools.

While various changes may be made in the detail construction, it is understood that such changes will be within the spirit and scope of the present invention, as is defined by the appended claims.

What I now claim is:

1. A walking buggy vehicle, comprising, in combination, a main frame, supported at its rear upon a pair of rear wheels, and supported, at its front, on a steering post of a front wheel, a treadmill upon said main frame including an endless belt, for a rider to walk thereupon, and a transmission, between said treadmill and an axle on which said rear wheels are affixed; said treadmill being upwardly inclined in a forwardly direction; and means to adjust said upwardly incline, said treadmill additionally including a pair of side rails, between which a plurality of rollers are supported rotatably free, said endless belt extending around all said rollers, and said adjustment means comprises the rear ends of said side rails being pivoted on a transverse pin, supported in brackets mounted on said main frame, while the forward ends of said side rails are integral with a transverse bar supported upon a screw extending downward through said main frame, and vertically adjustably secured thereto at selected height by nuts adjacent a lower and upper side of said main frame being engaged on said screw.

* * * * *